United States Patent
Beskrovny et al.

(10) Patent No.: US 9,678,859 B2
(45) Date of Patent: *Jun. 13, 2017

(54) DETECTING ERROR STATES WHEN INTERACTING WITH WEB APPLICATIONS

(71) Applicant: International Business Machines Corporation, Armonk, NY (US)

(72) Inventors: Evgeny Beskrovny, Ramat Gan (IL); Omer Tripp, Bronx, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/245,417

(22) Filed: Aug. 24, 2016

(65) Prior Publication Data

US 2016/0350210 A1 Dec. 1, 2016

Related U.S. Application Data (63) Continuation of application No. 15/061,146, filed on Mar. 4, 2016, now Pat. No. 9,442,829, which is a continuation of application No. 14/040,906, filed on Sep. 30, 2013, now Pat. No. 9,323,649.

(51) Int. Cl.
  *G06F 11/36* (2006.01)
  *G06F 17/30* (2006.01)
(52) U.S. Cl.
  CPC ...... *G06F 11/3688* (2013.01); *G06F 11/3664* (2013.01); *G06F 11/3672* (2013.01); *G06F 11/3684* (2013.01); *G06F 11/3692* (2013.01); *G06F 17/30873* (2013.01); *G06F 17/30896* (2013.01); *G06F 17/30905* (2013.01)
(58) Field of Classification Search
  CPC ............. G06F 11/3668; G06F 11/3684; G06F 11/3688
  USPC .................................................. 714/38.1, 41
  See application file for complete search history.

(56) References Cited

U.S. PATENT DOCUMENTS

| | | | |
|---|---|---|---|
| 8,839,201 B2 | 9/2014 | Schissel et al. | |
| 2005/0086643 A1* | 4/2005 | Shane | G06F 11/36 717/124 |
| 2007/0074188 A1* | 3/2007 | Huang | G06F 21/54 717/141 |
| 2008/0109680 A1* | 5/2008 | Kodaka | G06F 11/3688 714/38.1 |
| 2013/0159975 A1* | 6/2013 | Hu | G06F 17/30893 717/124 |

(Continued)

*Primary Examiner* — Chae Ko
(74) *Attorney, Agent, or Firm* — Cantor Colburn LLP; Bill Porter (57) ABSTRACT

Detecting error states when interacting with web applications is performed by accessing a first web page of a web application, determining that the first web page includes an input validation operation, configuring an input to cause the input validation operation to effect an error state, providing the input to the first web page, thereby effecting the error state, identifying a feature that is absent from the first web page before the input is provided to the first web page and present in the first web page after the input is provided to the first web page, and detecting that a second web page of the web application is in an error state if the feature is present in the second web page.

1 Claim, 6 Drawing Sheets

(56) References Cited

U.S. PATENT DOCUMENTS

2015/0095721 A1* 4/2015 Beskrovny .......... G06F 11/3664
714/48

* cited by examiner

```
// Submit verify required information
function dosubmit1() {
      error = "";
      if(document.frmquote.start_date.value         ==        "" ||
document.frmquote.end_date.value == "")
            { error = error + "\n" + "- Must enter coverage period for
quote."; }
      if(document.frmquote.residence_state.value == "")
            { error = error + "\n" + "- Must enter State of Residence
      for quote."; }
      if (error == "") {
            today = new Date();
            start = new Date(document.frmquote.start_date.value);
            end = new Date(document.frmquote.end_date.value);
            coverage_days = (end-start+86400000)/86400000;
            coverage_days = Math.round(coverage_days);

start_month = start.getMonth() + 1;
            start_date = start.getDate();
            start_year = start.getFullYear() + 1;
            fullyearcoverage = start_month + "/" + start_date + "/" +
start_year;
            fullyearcoverage = new Date(fullyearcoverage);
            fullyearcoverage = fullyearcoverage - 86400000;
            var jsDate2weeksAgo = new Date(2012, 3, 4, 9, 41, 51);
            if(start > today && end >= start && end <=
fullyearcoverage)
                  {       document.frmquote.coverage_days.value       =
coverage_days; }
                  if (start <= today) {
                        error += "- Start Date must be greater than
today.\n";
                        document.frmquote.start_date.value = ""; }
                  if (end <= today) {
                        error += "- End Date must be greater than
today.\n";
                        document.frmquote.end_date.value = ""; }
```

Fig. 3A

```
        if(end < start)                    ⎡—302
            { error = error + "\n" + "- Coverage End Date cannot
be prior to Coverage Start Date."; }
                                   ⎡—304
        if(end > fullyearcoverage)
            { error = error + "\n" + "- Coverage cannot be more
than one (1) calendar year."; } }
     if(document.frmquote.age_id_1.options[document.frmquote.age_id_1
.options.selectedIndex].value == 0)
            { error = error + "\n" + "- Must select Primary Insured's
age for quote."; }
     if(document.frmquote.tripcostid_1.options[document.frmquote.trip
costid_1.options.selectedIndex].value == 0)
            { error = error + "\n" + "- Must select Primary Insured's
travel cost for quote."; }
     if (document.frmquote.USA_attest.checked == false)
     { error += "- Please attest that all insured persons … in the
United States to continue.\n";}
        if(error == "") {      var myAjax;
                target = "purchase_engine";
                var newurl = "master.ajax.cfm";
                var pars = "step=ajax1";
                pars = pars + buildvarlist('frmquote');
                myAjax = new Ajax.Updater(
                    target,
                    newurl, { method : 'post',
                        parameters : pars,
                        onLoading     :       function()        {
document.body.style.cursor = "wait";},
                        onSuccess : function(obj) {scroll(0,0);},
                        onFailure    :     function(obj)        {
alert("Error"); $(target).innerHTML = "";},
                        onComplete     :       function(obj)
{document.body.style.cursor = "auto";} });} else { alert("Error\n--⌐-------------------------------------
----\n" + error);    } }         ⌐— 300
```

DETECTING ERROR STATES WHEN INTERACTING WITH WEB APPLICATIONS

DOMESTIC PRIORITY

This application is a continuation of the legally related U.S. application Ser. No. 15/061,146 filed Mar. 4, 2016 which is a continuation of legally related U.S. application Ser. No. 14/040,906 filed Sep. 30, 2013, which has now issued as U.S. Pat. No. 9,323,649B2, issued on Apr. 26, 2016; both of which are fully incorporated herein by reference.

BACKGROUND

The present disclosure relates to testing computer software applications in general, and more particularly to detecting error states when interacting with web applications.

So-called "web" applications typically include interrelated Hypertext Markup Language (HTML)-encoded web pages that are hosted by a computer server for access by one or more client computers via a computer network, such as the Internet. When testing web applications, dynamic analysis, or "black-box," tools typically employ "crawling" techniques to navigate to the various web pages of a web application in order to expose its various interfaces for testing. Such techniques typically require a degree of interaction with the web pages as well. For example, to test a banking application properly, a dynamic analysis tool would typically have to log in with valid credentials and provide input to one or more transaction screens for each of the banking operations.

The effectiveness of such dynamic analysis tools depends on their ability to uncover an application's interfaces, which in turn depends on their ability to navigate from one web page to another. Thus, for example, if a dynamic analysis tool navigates to a web page and encounters an error state, and the error state prevents the dynamic analysis tool from navigating to another web page and uncovering and testing its interfaces, this may result in a partial analysis, giving the tester the false impression that the application is safer and/or better than it really is. This is particularly problematic if the dynamic analysis tool is unable to determine that such an error state has been encountered.

SUMMARY

In one embodiment of the invention, a method is provided for detecting error states when interacting with web applications. The method includes accessing a first web page of a web application, determining that the first web page includes an input validation operation, configuring an input to cause the input validation operation to effect an error state, providing the input to the first web page, thereby effecting the error state, identifying a feature that is absent from the first web page before the input is provided to the first web page and present in the first web page after the input is provided to the first web page, and detecting that a second web page of the web application is in an error state if the feature is present in the second web page.

In other embodiments of the present invention, systems and computer program products are provided.

BRIEF DESCRIPTION OF THE DRAWINGS

Embodiments of the present invention will be understood and appreciated more fully from the following detailed description taken in conjunction with the appended drawings in which.

DETAILED DESCRIPTION

The embodiments of the present invention will now be described, although the description is intended to be illustrative of the invention as a whole, and is not to be construed as limiting the invention to the embodiments shown. It is appreciated that various modifications may occur to those skilled in the art that, while not specifically shown herein, are nevertheless within the true spirit and scope of the invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java™, Smalltalk™, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 1:
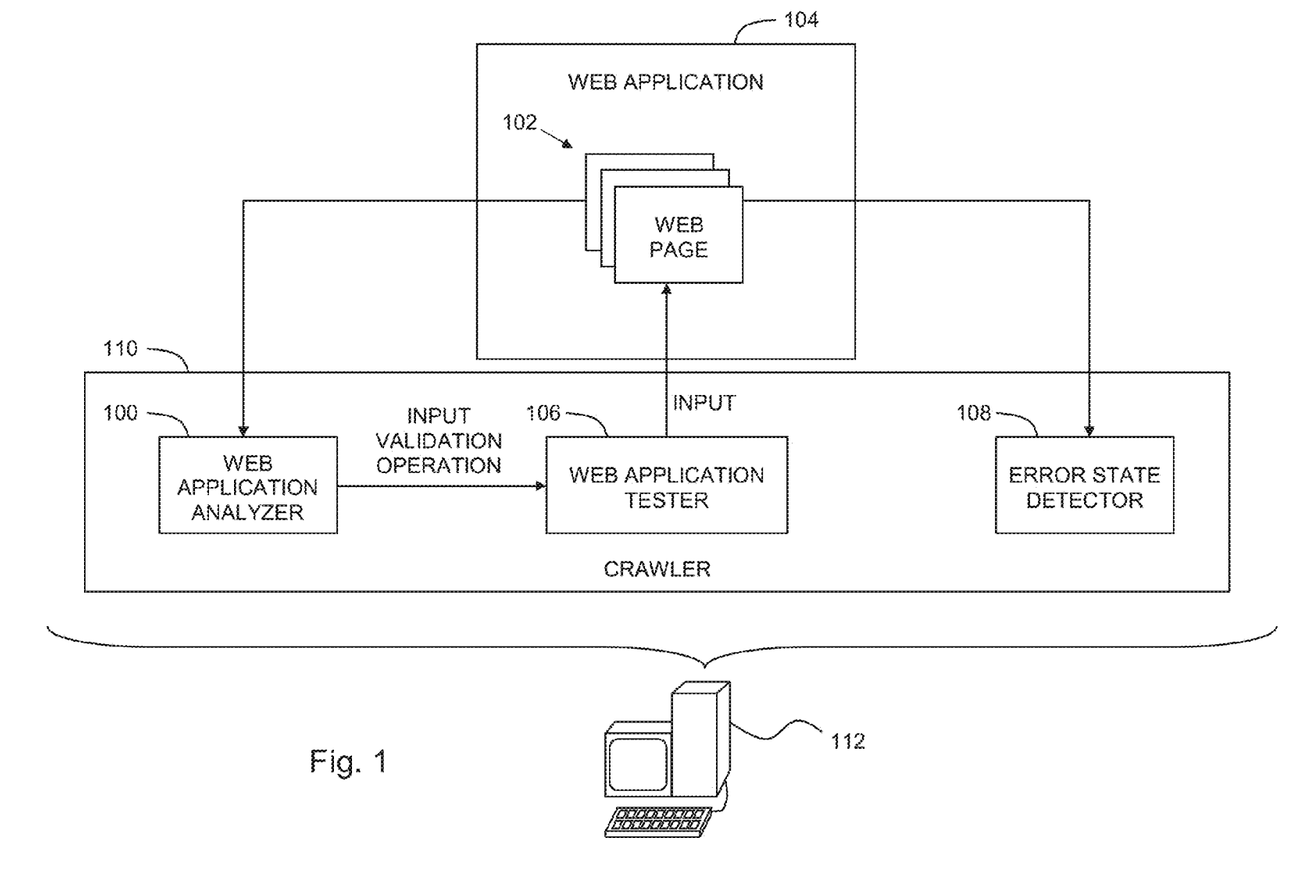
FIG. 1 is a simplified conceptual illustration of a system for detecting error states when interacting with web applications, constructed and operative in accordance with an embodiment of the invention.

Reference is now made to FIG. 1 which is a simplified conceptual illustration of a system for detecting error states when interacting with web applications, constructed and operative in accordance with an embodiment of the invention. In the system of FIG. 1, a web application analyzer 100 is configured to access web pages 102 of a web application 104, such as where web application 104 includes multiple Hypertext Markup Language (HTML)-encoded web pages that are interrelated, such as where the web pages are interconnected via hyperlinks. In an embodiment, web application analyzer 100 is configured to access and navigate between web pages 102 using conventional crawling techniques. Web application analyzer 100 may also be configured to determine, using conventional static analysis techniques, whether any web page 102 includes an input validation operation, such as may be in the form of JavaScript™ code.

For any web page 102 that includes an input validation operation: a web application tester 106 is configured to configure an input to cause the input validation operation to effect an error state, and provide the input to the web page 102, thereby effecting the error state; and an error state detector 108 is configured to identify any feature that is absent from the web page before the input is provided to the web page, and present in the web page after the input is provided to the web page.

In an embodiment, web application analyzer 100, web application tester 106, and error state detector 108 process multiple web pages 102 of web application 104 in the manner described above, where error state detector 108 is configured to determine which of the aforementioned features are common to a predefined number or percentage of the web pages 102.

Error state detector 108 is configured to use such identified features to detect that any given web page 102 of web application 104 is in an error state if the features are present in the given web page 102.

Once error state detector 108 detects that a given web page 102 of web application 104 is in an error state, web application tester 106 may be configured to provide one or more different, and randomly configured, inputs to the given web page 102 until the features are absent from the given web page, thus bypassing the error state. Additionally or alternatively, web application analyzer 100 is configured to analyze the input validation operation of any given web page 102, such as by statically analyzing software instructions associated with the input validation operation, to identify one or more characteristics of the input validation operation, where web application tester 106 is configured to configure any of the different inputs based on the identified characteristics in order to bypass the error state.

In an alternative embodiment, a crawler 110 is configured to access and navigate between web pages 102 using conventional crawling techniques, where crawler 110 provides web application analyzer 100, web application tester 106, and error state detector 108 with access to the crawled web pages 102. Any of web application analyzer 100, web application tester 106, and error state detector 108 is optionally embodied in crawler 110.

Any of the elements shown in FIG. 1 may be implemented by a computer, such by a computer 112, by implementing any of the elements in computer hardware and/or in computer software embodied in, e.g., a non-transitory, computer-readable storage medium in accordance with conventional techniques.

Figure 2:
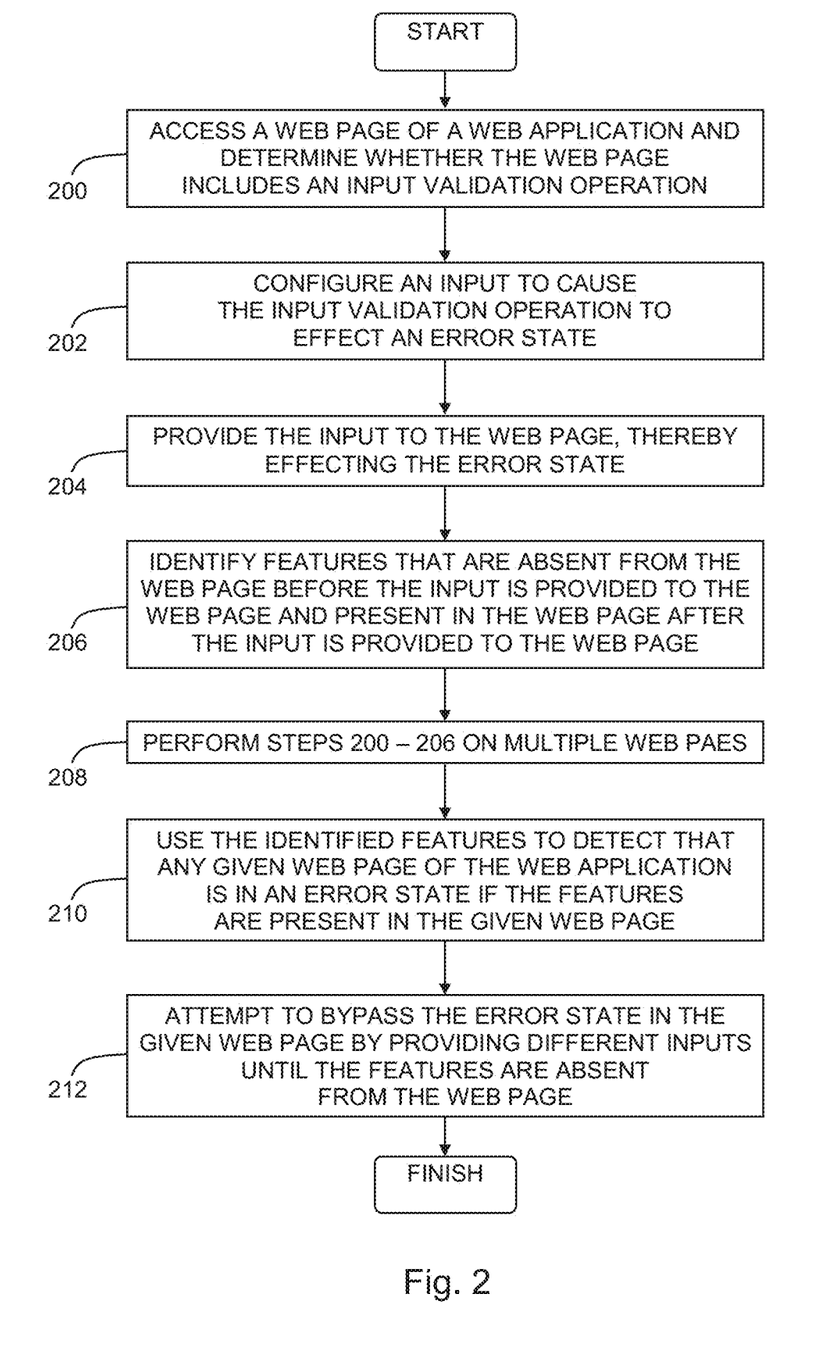
FIG. 2 is a simplified flowchart illustration of an exemplary method of operation of the system of FIG. 1, operative in accordance with an embodiment of the invention.

Reference is now made to FIG. 2, which is a simplified flowchart illustration of an exemplary method of operation of the system of FIG. 1, operative in accordance with an embodiment of the invention. In the method of FIG. 2 a web page of a web application is accessed to determine whether the web page includes an input validation operation (step 200). If the web page includes an input validation operation, an input is configured to cause the input validation operation to effect an error state (step 202), and the input is provided to the web page, thereby effecting the error state (step 204). Features are identified that are absent from the web page before the input is provided to the web page and present in the web page after the input is provided to the web page (step 206). Steps 200-206 may be repeated multiple times, such as until a predefined number or percentage of the web pages of the web application are processed by steps 200-206 (step 208). Thereafter, the identified features are used to detect that any given web page of the web application is in an error state if the features are present in the given web page (step 210). One or more attempts may be made to bypass the error state, such as by providing one or more different inputs to the given web page until the features are absent from the given web page (step 212), thus bypassing the error state. The inputs may be randomly configured or configured based on one or more characteristics of the input validation operation that are determined by statically analyzing software instructions associated with the input validation operation.

Figure 3A:
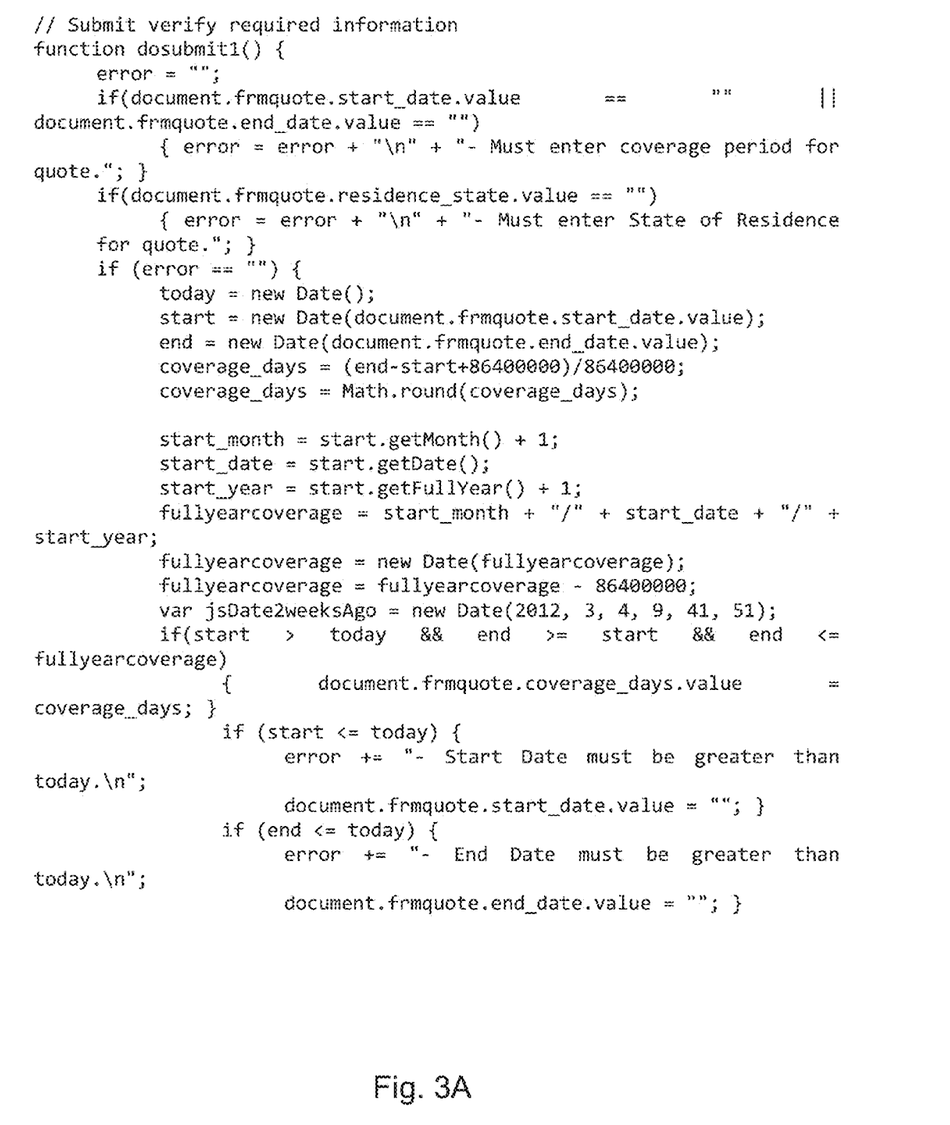
FIGS. 3A and 3B, taken together, is a simplified source code example illustrating the system of FIG. 1 and method of FIG. 2.
Figure 3B:
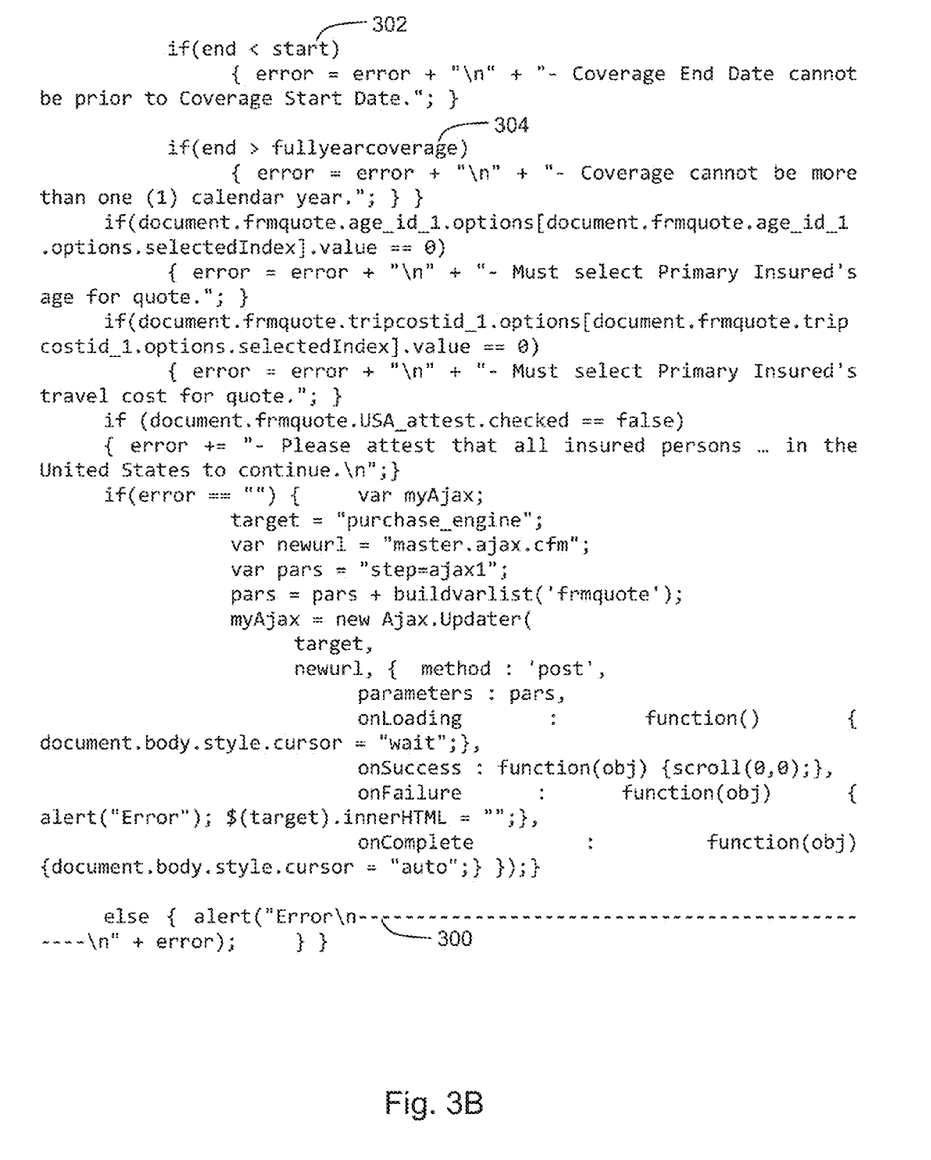
Figure 4:
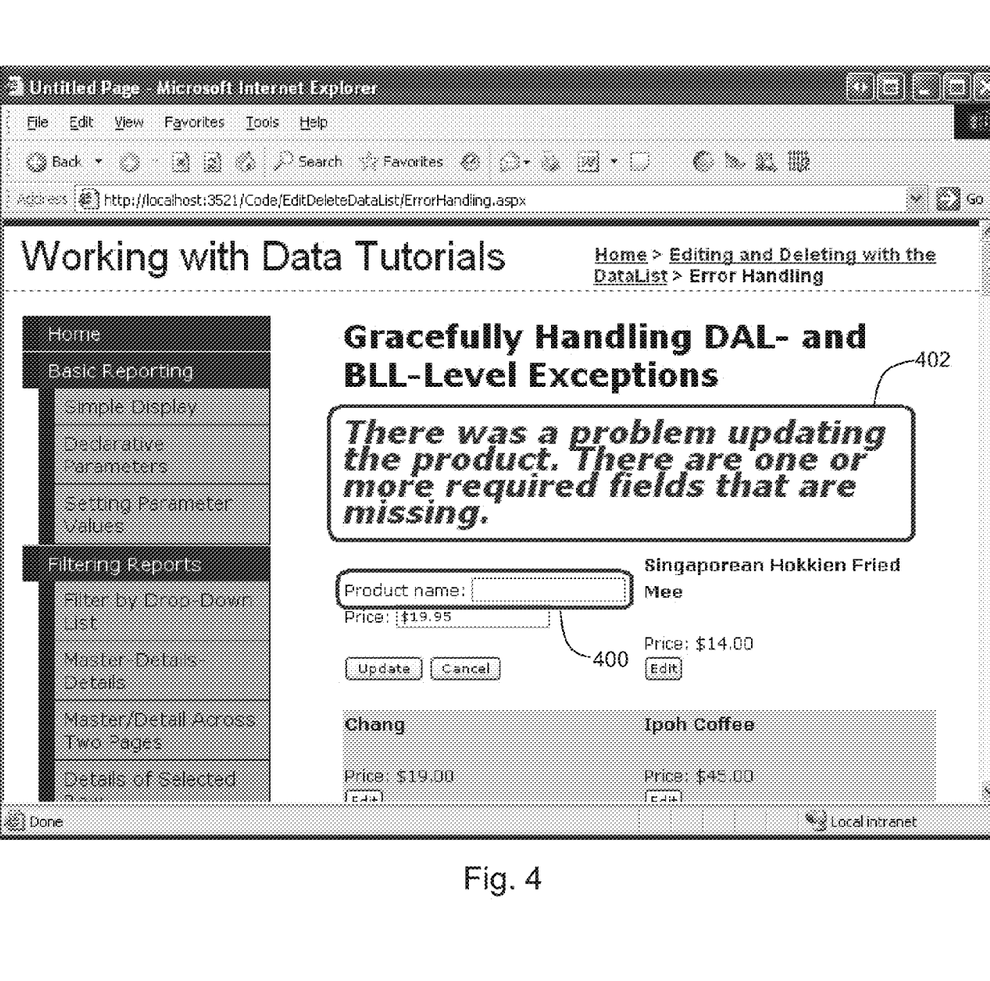
FIG. 4 is a simplified web page example illustrating the system of FIG. 1 and method of FIG. 2.

The system of FIG. 1 and method of FIG. 2 may be illustrated in the context of the example shown in FIGS. 3A, 3B, and 4. FIGS. 3A and 3B, taken together, show software instructions associated with an input validation operation of a web page. A control location 300 is associated with an error state. Inputs to the input validation operation may be configured to effect the error state, such as by configuring 'end' to be less than 'start' as shown at reference numeral 302, or by configuring 'end' to be greater than 'fullyearcoverage' as shown at reference numeral 304. FIG. 4 shows a web page in an error state where features 400 and 402 are not present in the web page before input is provided to the web page to effect an error state, yet are found to be present in the web page after the input is provided to the web page causing the error state to be effected.

Figure 5:
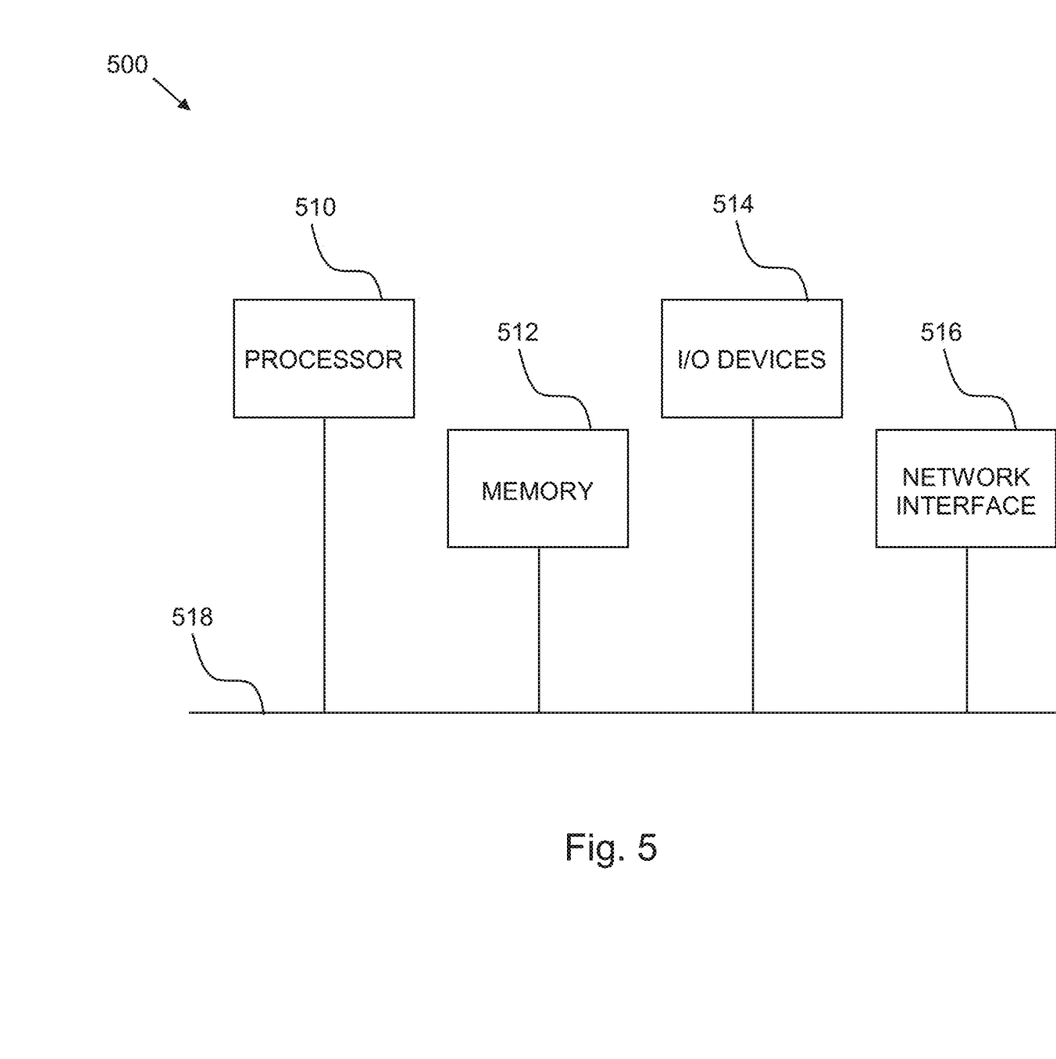
FIG. 5 is a simplified block diagram illustration of an exemplary hardware implementation of a computing system, constructed and operative in accordance with an embodiment of the invention.

Referring now to FIG. 5, block diagram 500 illustrates an exemplary hardware implementation of a computing system in accordance with which one or more components/methodologies of the embodiments described herein (e.g., components/methodologies described in the context of FIGS. 1-2) may be implemented, according to an embodiment of the invention.

As shown, the techniques for controlling access to at least one resource may be implemented in accordance with a processor 510, a memory 512, I/O devices 514, and a network interface 516, coupled via a computer bus 518 or alternate connection arrangement.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The flowchart and block diagrams in the Figures illustrate the architecture, functionality, and operation of possible implementations of systems, methods and computer program products according to various embodiments of the invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be appreciated that any of the elements described hereinabove may be implemented as a computer program product embodied in a computer-readable medium, such as in the form of computer program instructions stored on magnetic or optical storage media or embedded within computer hardware, and may be executed by or otherwise accessible to a computer.

While the methods and apparatus herein may or may not have been described with reference to specific computer hardware or software, it is appreciated that the methods and apparatus described herein may be readily implemented in computer hardware or software using conventional techniques.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A computer program product for detecting error states when interacting with web applications, the computer program product comprising:
 a non-transitory, computer-readable storage medium; and
 computer readable program code embodied in the computer-readable storage medium, wherein when executed by a computer the computer-readable program code is configured to:
 access a first web page of a plurality of web pages of a web application, determine that the first web page includes an input validation operation by statically analyzing software instructions within the first web page, and analyze the input validation operation to identify a characteristic of the input validation operation;
 configure an input to cause the input validation operation to effect an error state, and provide the input to the first web page, thereby effecting the error state; and
 identify a feature among the plurality of web pages that is:
  absent from the first web page before the input is provided to the first web page and present in the first web page after the input is provided to the first web page; and
 detect that a second web page of the plurality of web pages of the web application is in the error state, wherein the error state is based on determining as a common feature at least one feature identified in the plurality of web pages that is common to a predefined number or percentage of the plurality of web pages, and detecting that the second web page of the web application is in the error state if the common feature is present in the second web page;

crawl the web application and provide at least one of a web application analyzer, a web application tester, and an error state detector with access to at least one of the plurality of web pages; and provide at least one different inputs to the second web page until the feature is absent from the second web page, wherein the at least one different inputs is based on the characteristic of the input validation operation.

\* \* \* \* \*